United States Patent [19]

McGuire et al.

[11] Patent Number: 4,501,628

[45] Date of Patent: Feb. 26, 1985

[54] METHOD FOR REDUCTION OF FORMALDEHYDE EMISSIONS IN WOOD COMPOSITE PANELS

[75] Inventors: Michael L. McGuire; David M. Seluga, both of Klamath Falls; Michael R. Blum, Medford, all of Oreg.

[73] Assignee: Weyerhaeuser Company, Tacoma, Wash.

[21] Appl. No.: 578,894

[22] Filed: Feb. 10, 1984

[51] Int. Cl.³ .............................................. B32B 27/42
[52] U.S. Cl. ................................ 156/62.8; 156/331.3; 264/109; 428/529; 524/597
[58] Field of Search .................. 156/62.2, 62.8, 331.1, 156/331.3; 264/109; 528/493; 427/341, 342; 428/524, 526, 528, 529; 524/13, 14, 27, 593, 597

[56] References Cited

U.S. PATENT DOCUMENTS

| | | | |
|---|---|---|---|
| 3,983,084 | 9/1976 | Alexander et al. | 264/109 |
| 4,186,242 | 1/1980 | Holmquist | 427/342 |
| 4,376,807 | 3/1983 | Cannon et al. | 156/331.9 |
| 4,397,756 | 8/1983 | Lehmann | 156/336 |
| 4,409,293 | 10/1983 | Williams | 428/524 |

*Primary Examiner*—Michael Ball

[57] ABSTRACT

The invention is a method of reducing formaldehyde emission from wood-based composite boards bonded with aminoplast resins. A salt mixture comprising urea, or one of its analogs, a readily decomposible ammonia liberating compound and, alternatively, a resin catalyst is prepared in a finely granulated form. This is then added to the dried wood particles and blended, preferably prior to the addition of the adhesive binder resin. The salt mixture comprises 12-20 parts of the ammonia liberating compound, 65-88 parts of urea or its analog, and 0-15% of the catalyst. From 6-22.5% by weight of this mixture is used, based on resin solids. Formaldehyde evolution is reduced by 45-80% compared with untreated particleboard without adverse effect on physical properties or press time.

13 Claims, No Drawings

METHOD FOR REDUCTION OF FORMALDEHYDE EMISSIONS IN WOOD COMPOSITE PANELS

FIELD OF THE INVENTION

This invention relates to a method for reduction of formaldehyde vapor emission from wood composite panels bonded with formaldehyde containing adhesives. The method is particularly applicable to panel for interior residential or commercial construction.

BACKGROUND OF THE INVENTION

In recent years, energy consciousness has dictated much tighter construction of home and commercial dwelling units. As one aspect of this, there are now fewer internal air turnovers for any unit of time. In modern mobile homes, as one example, when doors and windows are closed, air turnovers typically range from 0.15 to 0.6 per hour, averaging about 0.3. When this tight construction has indeed helped to conserve energy, it has spawned a host of new problems. Among these are those caused by internally generated moisture and odors. In this latter category, minute quantities of formaldehyde vapor generated from a multitude of internal sources can be cited as one example. The sources of formaldehyde include tobacco smoking, natural gas cooking, carpeting, permanent press treatment of draperies and upholstering fabrics, and the urea-formaldehyde adhesives used in particleboard decking and in wall paneling. Formaldehyde evolution is usually more of a problem in hot, humid weather. The amounts emitted are very low. The ambient atmosphere in mobile homes currently being manufactured will rarely exceed 1.5 ppm and will typically be about 0.2 to 0.6 ppm.

To cure the problem, it is necessary to control all of the sources of formaldehyde. Unfortunately, elimination of one or two sources does not guarantee that the remaining level of formaldehyde will be reduced in proportion to the original contribution of these sources. Effort must be made along multivariate lines of attack to completely resolve the formaldehyde problem. One part of this effort, as represented by the present invention, has been to better control formaldehyde emission from particleboard bonded by formaldehyde-containing adhesives. Particlebaord decking and cabinetry core products are widely used in mobile homes and are usually regarded as significant contributors to the internal formaldehyde levels. The art has long recognized that formaldehyde emission from composite products, such as particleboard bonded with urea-formaldehyde resins, can be in part controlled by the addition of free urea to the system. Urea acts as a formaldehyde scavenger, both at and subsequent to the time of manufacture of the product. The art is divided into three general ways of accomplishing this end. One way is to add the urea directly to the resin. Here it appears to tie up free formaldehyde that may be present in the resin. In effect, the molar ratio of formaldehyde to urea is decreased. This approach is exemplified in British Pat. No. 1,480,096. It is further discussed in British Pat. No. 2,019,854 and by A. A. Moslemi in *Particleboard* Volume I, Southern Illinois University Press, Carbondale (1974). This idea is attractive in its simplicity but it has not been particularly successful. Physical properties of the resultant product are severely affected when enough urea is added to gain significant reduction of formaldehyde evolution. In addition to the penalty paid in poorer physical properties, press times are significantly increased.

Another approach developed out of the failure of the one just described. This involved isolation of the urea from the resin in some manner so that it does not interfere with resin curing but is available later to scavenge formaldehyde. This often involves applying a solution of urea to the wood particles, for example as taught in British Pat. No. 2,019,854; or to a portion of the particles as in German Pat. No. 1,653,167; or to an inert carrier material, as in U.S. Pat. No. 3,983,084, in which a mixture of urea and an amylaceous material is added to the binder system. Again, the ideas are excellent in concept but in actuality none of these references cited seem able to reduce formaldehyde evolution to more than about 50% of the untreated level. Much better control has been a sought-after goal. Lehmann, in U.S. Pat. No. 4,397,756, teaches a system which has found some commercial success. He adds a solution of urea protected by a carbohydrate-based material either to the particles or to the resin. While this system appears to be effective, it has the disadvantage of adding additional water to the particles. This higher moisture content can adversely affect press time. In extreme cases, it can also cause delaminations known as "blows" due to the formation of steam pockets during pressing.

A third approach can be mentioned. This involves reformulation of the resins themselves, usually in the direction of lower molar ratios of formaldehyde to urea. In recent years resin manufacturers have successfully reduced the molar ratio of formaldehyde to urea from a former level of about 1.4 to 1.6 to about 1.2 or even slightly lower.

Finally, other materials besides urea have been suggested, as in U.S. Pat. No. 4,186,242, in which ammonium lignosulfonate is used, or in U.S. Pat. No. 2,870,041 in which bisulfites are suggested for odor control in textiles. German DT No. 2847-975 shows the use of urea for formaldehyde absorption in pharmaceutical and cosmetic preparations.

Other approaches to reduction of formaldehyde emission have been developed as post-pressing treatments. Moen, in German DE No. 28 29 021, sprays hot panels out of the press with a 10% aqueous urea solution. The sprayed panels are then hot stacked for a period of time. While this treatment may indeed be effective for its intended purpose, it would be unacceptable to most manufacturers since it would cause severe surface roughening requiring heavy sanding. Neumann, in West German No. 29 29 775, proposes storing particleboard in a warm closed room with a volatile ammonium salt that will thermally decompose and release gaseous ammonia. Alternatively, the particleboard can be hot stacked with a layer of an ammonia generating salt, such as ammonium bicarbonate, between adjacent panels. The ammonia thus liberated by the heat reacts with formaldehyde vapor to form hexamethylenetetramine, a compound which is relatively stable at room temperatures. Westling, in E.P.C. publication No. 0,027,583 shows a very similar process. However, Westling notes that while the ammonium bicarbonate treatment is effective in the short term, it does little or nothing to eliminate longer-term problems with formaldehyde. He proposes to counteract this problem by including urea with the ammonium carbonate or bicarbonate. Westling's process apparently requires hot stacking the panels at 60° C. for two days, a requirement that manufacturers would find prohibitively expensive.

Problems of formaldehyde emission have long been a serious handicap to the wide acceptance of urea-formaldehyde foams as a home insulating material. Kelly, et al., U.S. Pat. No. 3,231,525, note that ammonium bicarbonate has been added to UF resins, prior to mixing with the foaming hardener, to control formaldehyde emissions. They propose, instead, adding a small amount of urea to the hardener solution. Justice, U.S. Pat. No. 3,312,639, adds a small amount of ammonium carbonate or bicarbonate to the resin component. Prior to preparing the foam, additional urea is added to the resin to adjust the mole ratio to between 1.6 and 2.0.

These approaches either stray from practicality in the manufacture of wood products or, like the others, fail to give adequate control of formaldehyde evolution. Even more so, do they fail to solve the problem for a secondary manufacturer who must purchase panels on the open market for remanufacture. To the past time, the secondary manufacturer has had little or no control over such aspects of his ultimate product as formaldehyde evolution, even though he would be likely to bear the brunt of any product liability claims.

SUMMARY OF THE INVENTION

The present invention comprises a method for reduction of both short- and long-term formaldehyde emission from composite wood panels. In particular, it is an effective means for reducing formaldehyde emissions by 45–80% below the emission values of untreated panels. In order to accomplish this end, a salt mixture is added to the wood particles. This mixture comprises an amino compound, a thermally unstable ammonium salt of a weak acid, and alternatively, a catalyst material which is preferably an ammonium salt of a strong acid. The ammonium salt of the weak acid should be decomposed to yield ammonia gas at temperatures which do not exceed about 120° C., preferably about 80° C. The amino compound should be of a particle size so that at least 55% will pass through a standard 16 mesh Tyler screen. This screen has square openings approximately 1.2 mm along each edge. The ammonium salt of the weak acid is preferably ammonium carbonate or ammonium bicarbonate. The amino compound is selected from the group of urea, melamine, guanidine, or mixtures thereof. Urea is a preferred material because of its lower cost and ready availability. When an ammonium of a strong acid is included in the salt mixture as a resin catalyst, it is preferably chosen from the group of ammonium sulfate, ammonium chloride, ammonium nitrate or mixtures of these materials. Ammonium sulfate or ammonium chloride are preferred.

The amino compound serves as a dispersant or carrier for the ammonium salts and these materials should be preblended before they are used. The mixture will normaly comprise from 12 to 20 parts by weight of the ammonium salt of the weak acid, from 65 to 88 parts of the powdered amino compound and from 0 to 15 parts of the ammonium salt of the strong acid.

The above salt mixture is preferably added to and blended with the wood particle furnish before the addition of resin. Alternatively, it can be added at the blender at the same time that the resin and other additives are sprayed in. Usage of the salt mixture should be from 6 to 22.5% by weight of adhesive resin solids. The adhesive will be an aminoplast resin system, most commonly an aqueous urea-formaldehyde condensation product in the range of about 50 to 65% solids content. From 4.5 to 12% by weight, on a solids bases, of the adhesive resin binder will be added to the wood particles. More typically, this usage will be in the 6 to 8% range. When the salt mixture, adhesive resin, and any other additives are thoroughly mixed with the wood particles, they are conveniently formed into mats. The mats are then transported on metal cauls where they are hot pressed for a time and at a temperature sufficient to cure the resin binder.

Depending on a number of factors, of which ultimate board density, mat moisture content, and ratio of formaldehyde to urea in the resin are perhaps the most important, the use of the additive composition of the present invention can reduce both short- and long-term formaldehyde emission of the finished panels by as much as 80% below the value of untreated panels. In general, emission values will be lower as the panel density increases or as the molar ratio of formaldehyde to urea in the binder resin is reduced.

It is an object of this invention to provide a method which will effectively reduce the formaldehyde emission of composite wood panels bonded by an aminoplast resin.

It is a further object to provide a method for the reduction of formaldehyde emission in composite wood panels bonded with an aminoplast resin in which the formaldehyde emission is significantly reduced with little or no effect on the physical strength of the panels.

It is another object to provide a method for the reduction of formaldehyde emission from aminoplast bonded composite wood panels which is simple and inexpensive and can be used without significant modification of existing equipment.

It is yet another object to provide a method for reducing formaldehyde emission from particleboard panels which does not add additional moisture prior to pressing and which does not require any increase in pressing time for the panels.

These and many other objects will become readily apparent upon reading the following detailed description of the invention.

DESCRIPTION OF THE PREFERRED EMBODIMENTS

The use of the term percent (%) has ambiguous meaning in the wood products industry. Normally it refers to parts by weight of some material in reference to 100 parts of dry wood. Thus, if wood is said to contain 12% moisture, it would contain 12 kg of water per 100 kg of dry wood substance. Likewise, when a composite wood product is said to contain 5% resin, it contains 5 kg of dry resin solids for each 100 kg of dry wood solids. The term percent is used in this context in the present description in order to keep it consistent with wood industry terminology. The following exceptions are made, however. When referring to the composition of the salt mixture and to the percentage of solids in the adhesive resin, percentages will be used in the context found in the chemical industry; i.e., weight of a component multiplied by a factor of 100 and divided by the total weight of the composition. Thus, if the additive composition is said to contain 75% urea, it contains 75 kg of urea per 100 kg of the total composition. Similarly, a resin stated to have 55% solids will contain 55 kg of solid material in each 100 kg of the liquid aqueous product.

Quite unexpectedly, it has been found that a salt mixture of finely granulated urea, or one of its chemical analogs, may be mixed with a weak acid ammonium salt, such as ammonium carbonate or bicarbonate, and added to the wood particle furnish without deleterious effects upon either cure time or panel physical properties. It appears to be necessary for the urea and weak acid ammonium salt to be premixed prior to addition to the wood particles. The urea seems to be a carrier or dispersant for the ammonium salt. If a resin catalyst comprising an ammonium salt of a strong acid is to be added with this salt mixture, it too should be preblended with the urea. The urea may either be purchased as a granulated material or it can be supplied in the more normal form of prills which may then be granulated in a hammermill or similar crusher. At least 55% by weight and preferably all of the granulated urea should pass through a 16 mesh Tyler screen which has square openings 1.17 mm along each edge. The ammonium carbonate or bicarbonate and the catalyst is added to the urea and blended in conventional equipment. The mixture will comprise from 65 to 88 parts by weight of ground urea, from 12 to 20 parts of ammonium carbonate or bicarbonate and from 0 to 15 parts of a catalyst such as ammonium sulfate or ammonium chloride. In the preferred mixture, the ratio of ammonium carbonate or bicarbonate to urea will be in the range of about 1:8 to 1:16 and all should pass through a 16 mesh screen.

The inventors do not fully understand why this finely granulated material may be added to the furnish without causing problems with press time or panel physical properties, as would be expected from prior experience. It may be because the ammonium weak acid salt forms a coating around the urea particles which prevent them from interfering with resin curing. The ammonium carbonate or bicarbonate is believed to decompose during the press cycle to yield ammonia and carbon dioxide. This ammonia will act as a scavenger for any free formaldehyde vapor which may be given off while the panels are being pressed and for some time afterward.

The following examples will serve to show the best mode known for practicing the present invention.

EXAMPLE 1

A salt mixture was prepaed by blending 88.9 kg of commercial grade urea which had been ground so that more than 55% passed through a 16 mesh Tyler screen with 11.1 pounds of commercial grade ammonium bicarbonate. These materials were mixed in a ribbon blender until a uniform product was achieved.

EXAMPLE 2

The particleboard discussed in the subsequent examples is manufactured by the following general procedure. Furnish is mixed western softwoods, typically about 60+% ponderosa pine, 10% cull wood of various species, 10% plywood veneer trim, usually mixed Douglas fir and true firs and the balance being particleboard trim and other recycled material. The pine is supplied predominately as dry planer shavings and dry or partially dried sawdust. The raw furnish materials are first screened and the fines used without further refining. Coarse shavings and cull wood are reduced in a hammermill or knife ring-type flaker while sawdust is reduced in a disc-type refiner.

The sawdust-derived furnish is ultimately dried in a steam heated dryer to 4.5–7% moisture. This material is typically used for surfacing. The coarser particles are dried to about 3.5–5% moisture in a direct fired dryer for use as furnish for the core portion. Dried particles are then sent to storage bins until needed for use.

Various particle streams are drawn from the bins and passed over weight belts that control the ratios of furnish ingredients. When a fines surfaced or three-layer board is being made, the ground sawdust from the disc refiners is treated separately for use as the surface layers. Single layer or homogeneous boards are made using only material from the shavings refiners.

The mixed particle streams are directed to a preliminary blender where the salt mixture is added and uniformly distributed. From there, the particles flow to a paddle blender where the resin and any other ingredients such as wax are added. Resin is sprayed on the particles in the blender through a parallel set of spray nozzles. Normal usage is from 6–8% resin solids per 100 part by weight of dry wood particles. Normally, where a multilayered panel is being made, the surface layers will have slightly higher resin usage than will the core portion.

Wax is also added to the furnish at the resin blender to achieve better water resistance. Normally about 0.28% wax will be added to the surface layers with about half of this amount being added to the core particles. The wax may be added as an emulsion, but it is preferred to use a steam atomized melted slack wax to reduce the amount of moisture being added to the furnish.

A typical urea-formaldehyde particleboard resin will contain from 50 to about 65% solids content. Water may be added with the resin as needed to achieve ultimate moisture contents of about 10% for surface particles and 8½% for core particles.

Particles from the blenders flow to one of four forming heads. Two lay down the respective faces and the other two form the interior portion of the boards. The mats, now on metal cauls, are rough trimmed to size. Material removed from the edges and ends is directly recycled to the core formers. Trimmed mats are weighed and deviations from the desired norm are fed back to the formers where any necessary adjustments are made. Immediately before pressing, the mats are given a very light surface water spray. The present process employs a 14 opening press having the capability of making boards 1.52×7.32 meters (5×24 feet) in size. Mats on their cauls are charged into the press. Closing time when making 19 mm (¾ in.) board is about 60 seconds until full pressure is reached. Press time is about 245 seconds at a temperature of about 169° C. (337° F.). After pressing, the pressure is slowly reduced during a 20 second decompression interval. The panels are run through a cooler, rough trimmed, and then stacked in readiness for final trimming, packaging and shipping.

It will be appreciated by those skilled in the art that there is considerable variation between equipment and procedures in different particleboard mills and that the present invention is not limited for use with the exact procedure or equipment described above. For example, it is well recognized that thinner boards will require a shorter press time.

Urea-formaldehyde particleboard resins are normally catalyzed by adding about 1% by weight of a 20% solution of ammonium sulfate or ammonium chloride. The catalyst solution may also have a small amount of ammonium hydroxide added as a buffering material. It is within the scope of the present invention to add this catalyst with the resin as just described or as a powdered ingredient in admixture with the formaldehyde scavenging salts. This choice can be made depending on the individual circumstances at each plant. Certain woods, such as Douglas fir, are quite acidic in nature and little or no catalyst is needed.

EXAMPLE 3

Panels of 19 mm fines surfaced particleboard were made as described in the previous example. The salt mixture of Example 1 was added to the core furnish only at a preblender in an amount equivalent to 6% urea and 0.75% ammonium bicarbonate, based on resin solids. The resin used with the surface particles is obtainable from Reichhold Chemicals, White Plains, N.Y. as RCI-99144 urea-formaldehyde resin. This material contains 65.5±0.5% solids content and is believed to have a very low molar ratio of formaldehyde to urea, in the range of 1.15. The core resin is also a urea-formaldehyde resin available from Georgia Pacific Corporation, Atlanta, Ga. as GP-3507. This resin has a similar solids content to the surface resin and is believed to have a molar ratio in the range of 1.2. 7.12% resin solids, based on dry wood, were added to the surface particles. The core resin usage was 6.14%. Atomized slack wax was added to each category of particles as described in Example 2. After pressing and cooling the panels, samples were taken for determination of physical properties and for measurement of formaldehyde evolution rates.

A similar set of panels was made, but without the use of any of the salt mixture, to serve as a test control.

Physical properties and formaldehyde evolution characteristics of the salt-treated and control panels are given in the following table.

TABLE

| | Density kg/m$^3$ | Modulus of Rupture MPa | Internal Bond kPa | Formaldehyde µg/mL |
|---|---|---|---|---|
| Untreated Control | 676 | 13.0 | 545 | 1.77 |
| Salt Mixture Treated* | 682 | 14.1 | 565 | 1.02 |

*Averages of triplicate samples

It is immediately apparent that key physical properties were not adversely affected by inclusion of the salt mixture. Formaldehyde evolution of the salt treated panels is reduced to a level of only 56% of the untreated material.

Formaldehyde evolution is estimated as follows: 8×12.7 cm samples are cut from different locations of a given panel. These are then conditioned by storing on edge, spaced apart, for seven days at 24±1.5° C. and 50±10% relative humidity. Samples are then placed on edge in a glass dessicator of 250 mm inside diameter having a total volume of approximately 10.5 L. The samples are allowed to rest upon a perforated percelain dessicator plate located near the bottom of the dessicator. A 400 mL glass beaker is placed upside down on the dessicator plate in approximately the center of the sample array. An open 100 mm diameter petri dish is placed on the top of the beaker and 25 mL of distilled water is pipetted into the dish. The dessicator is covered and maintained at 23.9±0.5° C. for 120 minutes±1 minute. At that time the lid is removed from the dessicator and 4 mL of the solution is pipetted into each of three 16×150 mm screw cap test tubes. A similar volume of distilled water is pipetted into a fourth test tube to act as a blank. To each of the test tubes is added 0.1 mL of a 1% freshly prepared chromotropic acid solution. After mixing, 6 mL of concentrated sulfuric acid is added to each test tube. The components are gently agitated until thoroughly mixed. The capped test tubes are then placed in a boiling water bath for 15±2 minutes. The test tubes are then removed from the water bath and allowed to cool to room temperature. Color developed in the solution is read on a spectrophotometer at a wave length of 580 nm. Readings are compared with a calibration curve prepared using known amounts of formaldehyde.

While the applicants have disclosed the best mode known to them of practicing the present invention, it will be clear to those skilled in the art that many minor changes can be made in the process and in the composition of the salt mixture without departing from the spirit of the invention. For example, the process is equally useful for products known as fiberboards or flakeboards. In a multilayer board, some or all of the layers may be treated. It is thus the inventors' intention that the scope of the invention should be limited only by the following claims.

What is claimed is:

1. A method of making an aminoplast bonded, wood-based composite board having low formaldehyde emission which comprises:
    a. comminuting the wood into a particulate form;
    b. preparing a dry salt mixture comprising 12 to 20 parts by weight of an ammonium salt of a weak acid, said salt being decomposible by heat to yield ammonia at temperatures not exceeding about 120° C., 65 to 88 parts of a powdered amino compound selected from urea, melamine, guanidine and mixtures thereof, and 0 to 15 parts of an ammonium salt of a strong acid;
    c. blending from 6 to 22% by weight, based on adhesive resin solids, of the dry salt mixture with the comminuted wood particles;
    d. further blending from 4.5 to 12% by weight of wood particles on a solids basis of a liquid, aqueous aminoplast adhesive binder resin into the salt-particle mixture; and
    e. forming the particles into mats and hot pressing the mats for a time and at a temperature sufficient to cure the resin binder.

2. The method of claim 1 which further comprises choosing the ammonium salt of the weak acid from the group of ammonium carbonate, ammonium bicarbonate and mixtures thereof.

3. The method of claim 1 which further comprises choosing the ammonium salt of the strong acid from the group of ammonium chloride, ammonium sulfate, ammonium nitrate and mixtures thereof.

4. The method of claim 1 which further comprises controlling the particle size of the amino compound so that at least 55% passes through a 1.2 mm square screen opening.

5. The method of claim 4 which further comprises controlling the particle size of the entire salt mixture so that at least 55% passes through a 1.2 mm square screen opening.

6. The method of claim 2 which further comprises selecting a ratio of ammonium weak acid salt to amino compound in the range of about 1:8 to 1:16.

7. The method of claim 1 which further comprises adding sufficient salt mixture to the wood particles to supply about 8–20% amino compound based on resin solids.

8. The method of claim 1 which further comprises blending the salt mixture with the wood particles prior to the addition of the adhesive binder resin.

9. The method of claim 1 which further comprises adding the salt mixture to the wood particles simultaneously with the adhesive binder resin.

10. The method of claim 1 in which the ammonium salt of the weak acid decomposes at a temperature below about 100° C.

11. The method of claim 1 in which the composite board product is a multilayer board.

12. The method of claim 11 which includes treating all of the layers with the salt mixture.

13. The method of claim 11 which includes treating less than the full number of layers with the salt mixture.

* * * * *